(12) United States Patent
Feng et al.

(10) Patent No.: US 7,500,220 B1
(45) Date of Patent: Mar. 3, 2009

(54) SHARED CODE MANAGEMENT

(75) Inventors: Yang Feng, Waltham, MA (US); Peter Szpak, Newton, MA (US); Vijay Raghavan, Framingham, MA (US); Jan Sjodin, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 1118 days.

(21) Appl. No.: 10/749,294

(22) Filed: Dec. 30, 2003

(51) Int. Cl.
*G06F 9/44* (2006.01)

(52) U.S. Cl. .................. 717/106; 717/101; 717/104; 717/121

(58) Field of Classification Search .................. None
See application file for complete search history.

(56) References Cited

U.S. PATENT DOCUMENTS

| | | | | |
|---|---|---|---|---|
| 5,530,862 A | * | 6/1996 | Wadsworth et al. | 713/1 |
| 5,568,612 A | * | 10/1996 | Barrett et al. | 709/203 |
| 5,623,604 A | * | 4/1997 | Russell et al. | 717/167 |

* cited by examiner

*Primary Examiner*—Chuck O Kendall
(74) *Attorney, Agent, or Firm*—Lahive & Cockfield, LLP; Kevin J. Canning

(57) ABSTRACT

An electronic device and method are provided to enable the management of shared code. Code may be shared if the environmental configuration is suitable for execution of the code and the functionality of the code matches. An identifier is provided to correspond to the functionality for a unit of code. Examples of identifiers can include file names, function names, macro names and class names. A checksum may also be used to identify the functionality of the unit of code. An organizational structure is configured to have constituents corresponding to environmental configurations suitable to execute the unit of code. Examples of the organizational structure include a directory structure or a class structure. The various units of code may be stored in the organizational structure and located by the constituent in which they are located and their functionality determined by the identifier to enable sharing.

101 Claims, 5 Drawing Sheets

SHARED CODE MANAGEMENT

FIELD OF THE INVENTION

The present invention relates to computer-generated code, and more particularly to the management of code that may be shared.

BACKGROUND OF THE INVENTION

Various classes of block diagrams describe computations that can be performed on application specific computational hardware, such as a computer, microcontroller, FPGA, and custom hardware. Classes of such block diagrams include time-based block diagrams such as those found within Simulink® from the MathWorks, Inc. of Natick Mass., state-based and flow diagrams such as those found within Stateflow® from the MathWorks, Inc. and data-flow diagrams. A common characteristic among these various forms of block diagrams is that they define semantics on how to execute the diagram.

Historically, engineers and scientists have utilized time-based block diagram models in numerous scientific areas such as feedback control theory and signal processing to study, design, debug, and refine dynamic systems. Dynamic systems, which are characterized by the fact that their behaviors change over time, are representative of many real-world systems. Time-based block diagram modeling has become particularly attractive over the last few years with the advent of software packages such as Simulink® from the MathWorks, Inc. of Natick, Mass. Other examples of software for modeling includes state-based and flow diagrams, such as those found within Stateflow® from the MathWorks, Inc. of Natick, Mass., data-flow diagrams, and software diagrams, such as those found in the Unified Modeling Language. Such packages provide sophisticated software platforms with a rich suite of support tools that makes the analysis and design of dynamic systems efficient, methodical, and cost-effective.

A common characteristic among these various forms of block diagrams is that they define semantics on how to execute the diagram. Many packages include a code generation capability that converts the block diagrams to executable code that can execute on computational hardware, such as, for example, a computer microcontroller, field programmable gate arrays (FPGAs), and custom hardware. The executable code can be in the form of a general purpose programming language such as C/C++, assembly code, or a hardware description language.

In present day industrial projects, computer-generated models are being used that have reached a stunning level of complexity in terms of size. For example, tens of thousand of blocks that represent primitive and aggregate mathematical operations may be present.

In order to manage the complexity of such models, partitioning is used to create more or less separate and independent modules (or 'units') in the model. This facilitates teams of engineers to work on engineering projects where each engineer (or, possibly again, a team of engineers) is responsible for one unit of the overall model. This paradigm is often a necessity in that the overall system development task has reached a level of complexity that is beyond the cognizance of any one single individual.

Typically, an architectural model is applied that contains a number of more or less independent modules. These modules are developed largely independent of the architecture and so the architecture modelers may be 'customers' of the separate design teams responsible for each of the modules.

When a desired architecture has been decided on and specific versions of its included modules have been selected, the overall system needs to be analyzed. This can be done by first using simulation followed by a stage where the implementation as, e.g., generated code for the block diagram is used. Such generated code is used in critical design stages such as rapid prototyping and hardware in the loop simulation.

In general, the overall code-base corresponding to an overall block diagram can become very extensive and heterogeneous as different implementations may be chosen for each of the modules and so may consist of binaries generated from different programming languages or even a mixture of programming languages and hardware synthesis languages such as VHDL. Typically, though, one programming language, such as C/C++, is used across the module design teams.

In large scale modeling projects that rely on automatic code generation, typically a large number of support functions or classes and auxiliary code such as typedefs and global symbols are used in the actual core algorithm code. For example, to keep cost low, instead of using floating point microprocessors, it may be desired to implement embedded software on fixed point microprocessors. These, however, rely on fixed representations of accuracy with which numerical values are captured. The characteristics of these representations are called their fixed-point datatype. Also, when generating code for fixed point processors, conversion between these types and from floating point to fixed point as well, is required. This conversion process is implemented by fixed point conversion utility functionality.

Automatic code generation can create inefficiencies by automatically generating redundant code. If some type of code sharing is implemented with automatically generating code, difficulties can arise in the management of shared code, such as management of the proper platform for execution of the code, such as operating systems, processors, etc. Also, duplicate names of units of code can cause name conflicts when models are combined, as the names then become ambiguous.

SUMMARY OF THE INVENTION

A need exists in the art for a method of managing the code so as to minimize name clashes and generation of redundant code upon combination or interaction of independently developed code units. The present invention is directed towards solutions for this need. The present invention enables the use of a method in an electronic device, The method includes the steps of determining a functionality of a unit of code and an environment configuration suitable for executing the unit of code and automatically providing an identifier corresponding to the functionality for the unit of code. Examples of identifiers can include file names, function names, macro names and class names.

According to another embodiment of the invention, in an electronic device, a method is provided for the management of software. In this embodiment, the method includes the step of providing an organizational structure having a plurality of constituents, the constituents corresponding to unique environment configurations. Another step provides an identifier corresponding to a functionality of a unit of code in the organizational structure. Examples of organizational structures can include directory structures and class structures, and examples of constituents can include directories and classes.

A further embodiment of the invention also provides, in an electronic device, a method for management of software. In this method, a utility having a first functionality is selected to be processed. A characteristic of a first environment configuration is determined. An organizational structure is searched for a constituent corresponding to the first environment configuration. A constituent corresponding to the first environment configuration is created if the constituent corresponding to the first environment configuration is not found in the searching an organizational structure step. A name is generated for the first functionality and the constituent corresponding to the first environment configuration is searched for an identifier of a unit of code, the identifier corresponding to the name for the first functionality. If the identifier is not found in searching the constituent corresponding to the first environment configuration step, the unit of code is created having the first functionality and suitable for execution in the first environment configuration.

It is understood that the methods of the present invention may be located on a medium holding electronic device executable steps and/or may be methods used in an electronic device.

BRIEF DESCRIPTION OF THE DRAWINGS

The present invention will become better understood with reference to the following description and accompanying drawings, wherein.

DETAILED DESCRIPTION

According to various embodiments of the invention, an electronic device and method are provided to enable the management of shared code. In an illustrative embodiment, the invention provides an identifier to correspond to a functionality of a unit of code and an organizational structure having at least one constituent corresponding to an environmental configuration suitable to execute the unit of code.

Figure 1:
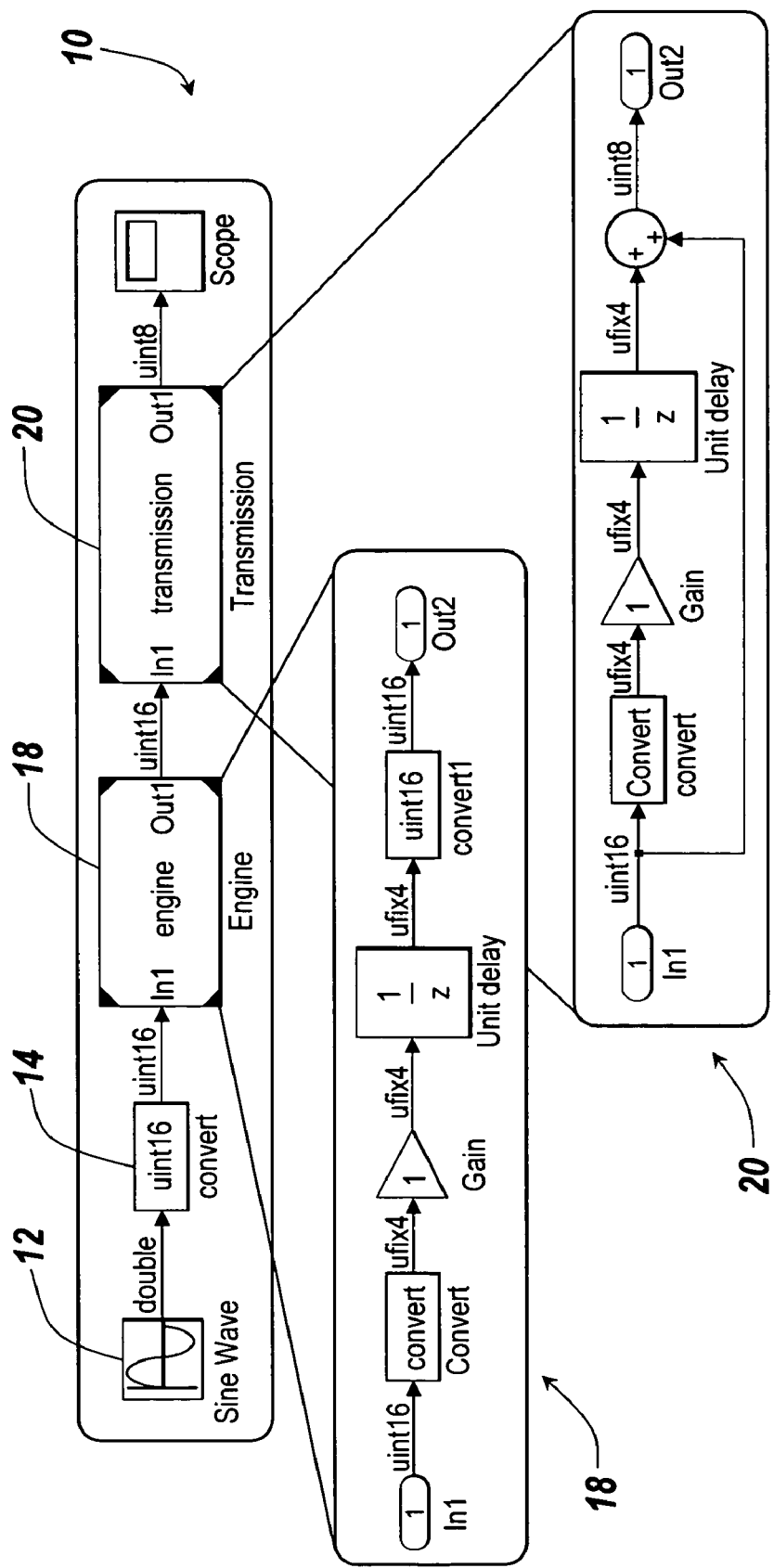
FIG. 1 illustrates an example model for purposes of discussion.

As shown in the example block diagram of FIG. 1, a model 10 sampled sine wave 12 is converted into a fixed point representation by the convert block 14. The data type of this fixed point value is uint16, which is compatible with the input of the Engine model 18. Within this model, a ufix4 fixed point data type is used in intermediate computations, but the output is computed in another fixed point representation, i.e., uint16. This in turn is compatible with the input to the Transmission model 20, that computes a uint8 output, but uses a ufix4 fixed point data type in intermediate computations.

When generating code for this architecture, state of the art may generate code for each of the Engine and Transmission models 18, 20 that then need to be combined. Automatic code generation, produces a number of utility files for those two models that may include duplicate functionality. To illustrate, consider the file engine.c generated by the engine model. It contains functionality to convert unit16 into ufix4 as is implemented in the code snippet below by the function FIX2FIX_U4_U16:

```
/* Opaque: '<Root>/Opaque' */
/* Output: '<Root>/Out 2' */
engine3200cc_Y.Out2=rtb_convert1;
/*
 * Fixed-Point Conversion Block: '<Root>/convert'
 * Input0 Data Type: Pure Integer U16
 * Output0 Data Type: Pure Integer U4
 * Round Mode: Floor
 * Saturation Mode: Wrap
 * Output's Real World Value should equal
 * input's Real World Value, if possible.
 */
rtb_convert=FIX2FIX_U4_U16(engine3200cc_U.In1);
```

This same functionality, however, is also generated for the transmission model as can be seen in the following code snippet from transmission.c.

```
/* Opaque: '<Root>/Opaque' */
/* Output: '<Root>/Out 2' */
transmission_Y.Out2=rtb_Sum;
/*
 * Fixed-Point Conversion Block: '<Root>/convert'
 * Input0 Data Type: Pure Integer U16
 * Output0 Data Type: Pure Integer U4
 * Round Mode: Floor
 * Saturation Mode: Wrap
 * Output's Real World Value should equal
 * input's Real World Value, if possible.
 */
rtb_convert=FIX2FIX_U4_U16(transmission_U.In1);
```

This conventional approach has two drawbacks: (i) redundant code is generated ('code bloat') and (ii) there may be a conflict when compiling the two models into one architecture as they both define functionality with the same name. In addition to these apparent drawbacks, the generated code that is redundant is compiled as well, leading to longer compilation times.

The present invention is directed toward mitigating the excess generation of redundant code. It can provide minimal algorithm code that links with automatically generated utility functionality. According to an illustrative embodiment, this functionality can be centralized and indexed such that it can be reused by different and separate models. This can minimize overhead in the code generation process by generating the source code only when needed. Similarly, it can reduce compile time as re-used functionality that has been compiled previously does not need to be compiled again.

This invention can minimize difficulties occurring when code of multiple models has to be integrated. Also, it can become possible to have code for different releases co-exist in a model-based embedded software project.

According to an illustrative embodiment of the invention, code may be shared if the environmental configuration is suitable for execution of the code and the functionality matches. In order to determine if the environmental configuration is suitable, characteristics of the environmental configuration may be reviewed. Examples of characteristics of the environmental configuration can include, but are not limited to, a word size on a target processor, a word size on a host processor, an execution software type, an execution software version number and an operating system. Matching of functionality can be determined in a wide variety of ways of analyzing characteristics of the functionality of a first unit of code to compare it to the characteristics of the functionality of a second unit of code. In one example, a checksum can be calculated from pertinent characteristics of the functionality. Examples of characteristics of the functionality can include, but are not limited to, an input type and an output type of said unit of code, an operation on an input to said unit of code. A wide variety of checksum comparisons using a one-way hash are within the scope of the invention, examples include, but are not limited to, the MD5 checksum available from RSA Security Inc, of Bedford, Mass. or cyclic redundancy check (CRC).

Figure 2:
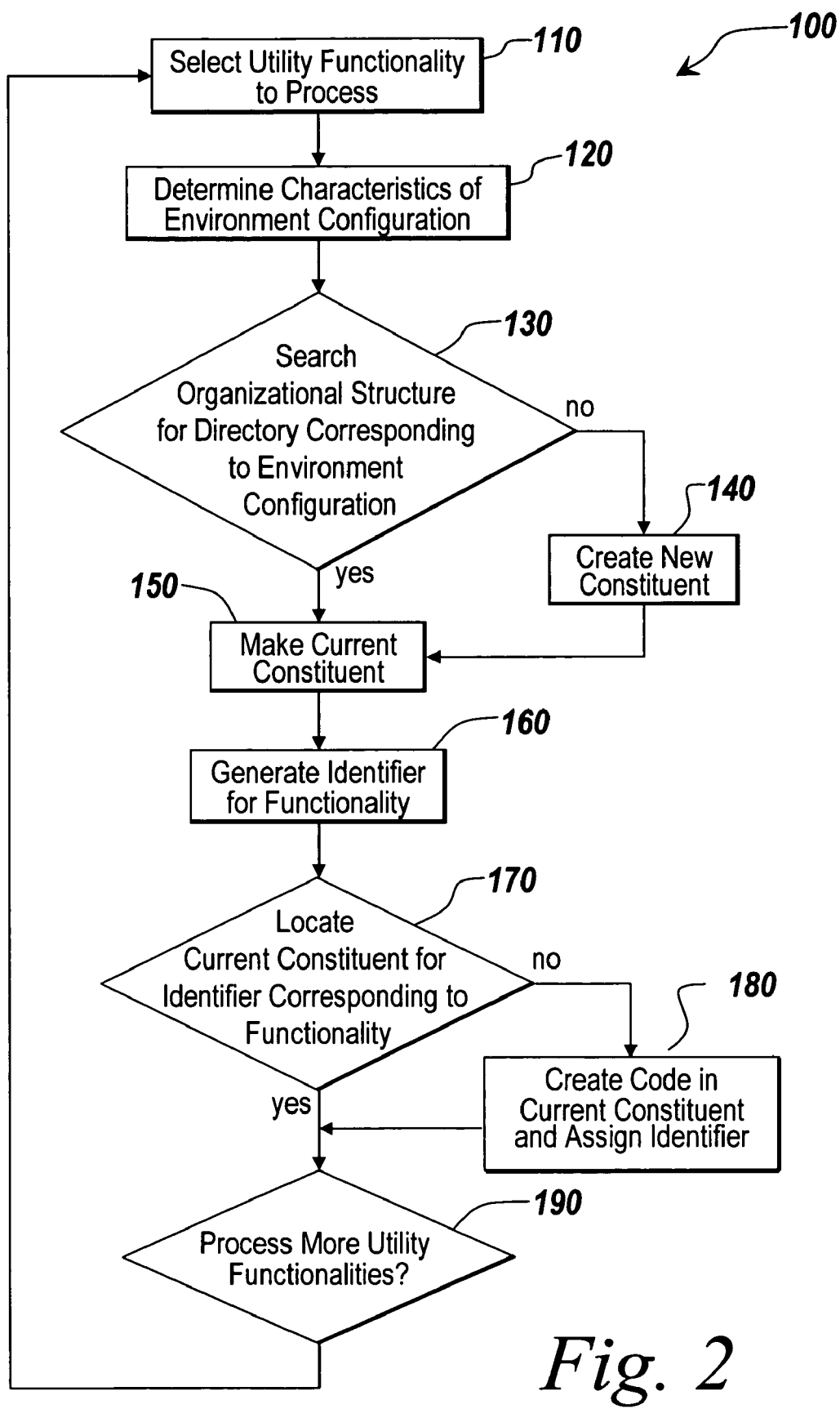
FIG. 2 illustrates a method according to an illustrative embodiment of the present invention.

As illustrated in FIG. 2, according to an illustrative embodiment of the invention, a method 100 is provided having the initial step of selecting a utility functionality to process, step 110. Characteristics of the current environment configuration are then determined, step 120, such as by computing a checksum or other quantitative measure of characteristics of the current environment configuration.

An organizational structure is provided. In the illustrative embodiment, the organizational structure is a directory structure that is used for organization of files containing code. Another example of an organizational structure is a class structure. The organizational structure may optionally be configured to have one or more constituents, such as directories or classes, corresponding to a specific environment configuration. The constituents may be named to correspond to the specific environment configuration and/or may be managed by a database mapping specific environment configurations to constituents, such as by the use of checksums formed from characteristics of the environment configuration.

The organizational structure is searched to determine if the organizational structure contains a constituent corresponding to the current environment configuration, step 130. If such a constituent does not exist, the constituent, such as a directory or class, is created, step 140. The constituent is then made the current constituent, step 150.

An identifier is generated for the functionality of the utility being processed, step 160. Identifiers are generated such that the same functional characteristics will result in a constituent identifier corresponding to that functionality. For example, a unique mapping may be provided between the functionality and the name of the file that it contains. In one illustration, the utility function to convert uint16 fixed point representation into ufix4, may be called FIX2FIX_U4_U16. In addition to file names, other examples of identifiers include, but are not limited to, function names, macro names and class names.

The identifier generation may seek to satisfy the twin constraints of (a) incremental code-generation, and (b) compiler restriction on the length of a function name (typically less than 32 characters). The first constraint mandates deterministic and consistent names for utility functions, e.g., a utility function with identical functionality must always generate the same identifier. The second constraint precludes simplistic name generation schemes that use arbitrarily long sequences of qualifiers to capture the essence of the functionality in the identifier.

For some types of utilities, such as fixed point utility functions, the total number of possible functions is finite, less than $2^{31}$. This makes it possible to use a naming convention that satisfies the above two constraints. Examples of such identifies and associated code are provided below.

EXAMPLE 1

Divide operation, in the form of a macro. Inputs are uint32 and uint16, and ouput is uint8.

```
/*****************************************
*******************
* Fixed Point Division Utility DIV_U8_U32_U16
* Values
* Vc=Va/Vb
* Stored Integer Formula
* C=(A/B)*2^0
*
* Division By Zero
* 0/0 will saturate to the output maximum
* positive/0 will saturate to the output maximum
*
* overflow is possible (in addition to division by zero)
* HiQuot=2^32-2^0
 =(2^32-1)/(1) *(2^0)
* HiOut=2^8-1
* LoQuot=0
* LoOut=0
* overflows will WRAP (modulo 2)
* aside from code for division by zero
* no code specific to overflow management is required
*
* because rounding of negatives does NOT arise
* round to ZERO equivalent to
* round to FLOOR equivalent to
* round to EASIEST
* no code specific to rounding is included
*/
#define DIV_U8_U32_U16(C,A,B)\
{\
/* Handle division by zero */\
if ((B)==0)\
{\
/* saturate to maximum */\
(C)=(uint8_T)((0xFFU));\
}\
else \
{\
/* compute quotient */\
/* output precision matches natural precision, so \
* straight division gives desired results \
*/\
(C)=(uint8_T)((A)/((unsigned)(B)));\
}\
}\
/* end macro DIV_U8_U32_U16
*****************************************
*******************/
```

EXAMPLE 2

Positive Accumulation operation, with saturation turn on, in the form of a macro. Both input and output's datatype is uint16.

```
/*****************************************
*********************
* Fixed-Point Positive Accumulation Utility ACCUM_POS_U16_U16_SAT
* Values
* Vc+=Vb
* Stored Integer Formula
* C+=B
*
* overflow is possible for all accumulations
* overflows will SATURATE
* code specific to overflow management is included
*/
#define ACCUM_POS_U16_U16_SAT(C,B)\
{\
/* Implement raw accumulation */\
(C)+=((unsigned)(B));\
/* Check for overflow */\
if((C)<((unsigned)(B)))\
{\
/* Saturate overflow to maximum */\
(C)=(uint16_T)(0xFFFFU);\
}\
}\
/* end macro ACCUM_POS_U16_U16_SAT
*****************************************
********************/
```

EXAMPLE 3

Conversion utility, with saturation turn on. It's a function. input is uint32, SR15 means shift right by 15 bits to get output whose type is uint16.

```
/*****************************************
********************
* Fixed-Point to Fixed-Point Conversion Utility FIX2FIX_U16_U32_SR15_SAT
* Values
* Vc=Vb
* Stored Integer Formula
* C=2^-15*B
*
* overflow is possible
* HiConvert=2^17-1
* HiOut=2^16-1
* LoConvert=0
* LoOut=0
* overflows will SATURATE
* code specific to overflow management is included
*
* round to ZERO equivalent to
* round to FLOOR because input unsigned
* no code specific to rounding is required
*/
uint16_T FIX2FIX_U16_U32_SR15_SAT(unsigned int B)
{
uint16_T C;
/* saturation cast */
}
unsigned int rInTemp=LSRu(15,B);
if (rInTemp>(0x0000FFFF))
{
C=*(uint16_T)(0xFFFFU);
}
else
{
C=((uint16_T)rInTemp);
}
}
return (C);
}
/* end FIX2FIX_U16_U32_SR15_SAT
*****************************************
***********/
endif
```

EXAMPLE 4

Multiply operation in the form of a macro. inputs are uint8, and output is uint32.

```
/*****************************************
*********************
* Fixed Point Multiplication Utility MUL_U32_U8_U8
* Values
* Vc=Va*Vb
* Stored Integer Formula
* C=A*B*2^0
*
* overflow is impossible
* HiProd=2^16-2^9+2^0
* =(2^8-1)*(2^8-1)*(2^0)
* HiOut≦2^32-1
```

```
* LoProd=0
* LoOut=0
* so SATURATE verses WRAP is irrelevant
* no code specific to overflow management is required
*
* rounding irrelevant 2^0 NO shifts right
* no code specific to rounding is required
*/
#define MUL_U32_U8_U8(C,A,B)\
{\
\
C=(((unsigned int)(A))*((unsigned int)(B))); \
}\
/* end macro MUL_U32_U8_U8
*****************************************************
********************/
```

For other types of utility functions, such as exported graphical functions from Stateflow® charts, auto-generated specialized functions from Embedded MATLAB® Scripting blocks, the space of possible functions is potentially infinite and a naming convention may not satisfy the second constraint of name-length restrictions. For these types of functions, a checksum may be computed based on one-way hash functions using functional characteristics of the utility that can uniquely define it. The bit-pattern of the checksum may be used to compute a small, but probabilistically unique prefix for the function name. This scheme satisfies the above two constraints: (a) one-way hash functions yield deterministic prefix strings, (b) one-way hash functions "compress" arbitrary number of qualifiers that define the utility into typically small strings (under 20 characters) that are probabilistically unique, e.g., the likelihood of generating the same prefix for two different utilities may not be zero, but is very low. Furthermore, the generated utility functions can be embedded with comment strings that contain the full specification of the functions, which can be used to detect and flag incorrect sharing.

EXAMPLE 5

In the following example, two different specializations originate from a polymorphic function to compute absolute value. These are generated from an Embedded MATLAB scripting block. The first specialization computes absolute value of a vector of 3 elements. The second specialization computes the absolute value of a vector of 4 elements. The defining attributes of each specialization are (a) name of the function, (b) number of input parameters, (c) number of output parameters, (d) sizes and types of input parameters, and (e) sizes and types of output parameters. These attributes can be captured as a comment string (shown inside the body of the function). Applying a well-known one-way hash function algorithm (Message Digest 5 algorithm) on this comment string produces a 128 bit binary stream (16 bytes). This binary stream can be converted into an ASCII character string by a variety of techniques. In the examples shown, the stringification was done by mapping each byte of the 16 byte stream to a letter in the range (a-z). The resultant 16 character string is used as a uniquifying prefix for the name of the shared utility function as well as the file containing it. The following examples show how two seemingly similar but different specializations produce two distinct function names that are unique within the first 16 characters. Furthermore, the name generation depends only on the attributes of the specialization, thus ensuring deterministic and consistent name generation.

```
void hdjmjmopdbiephlf_abs(real_T *x, real_T *y)
{
int8_T i;
int32_T i1;
/* real_T
argin=1
argout=1
input 0
type=real_T {col}[3]
Mclass=[3×1 double]
/
for(i1=0; i1<=2; i1++) {
y[i1]=0.0;
}
for(i=1; i<=3; i++) }
y[(int8_T)(i-1)]=fabs(x[int8_T)(i-1)]);
}
}
void jekfopphmophhlfk_abs(real_T *x, real_T *y)
{
int8_T i;
int32_T i1;
/* real_T
argin=1
argout=1
input 0
type=real_T{col}[4]
Mclass=[4×1 double]
*/
for(i1=0; i1<=3; i1++) {
y[i1]=0.0;
}
for(i=1; i<=4; i++) {
y[(int8_T)(i-1)]=fabs(x[(int8_T)(i-1)]);
}
}
```

With further reference to the method 100 of FIG. 2, the generated identifier is compared with identifiers present in the current constituent, step 170. If a matching identifier is not found, code is generated in the current constituent and placed in as a unit of code having the generated identifier, step 180. Examples of units of code can include files, functions, macros and classes.

If all required utility functionalities have not been processed, step 190, the method 100 repeats again at another utility functionality to process, step 110. If all utility functionalities have been processed, the method 100 ends.

Figure 3:
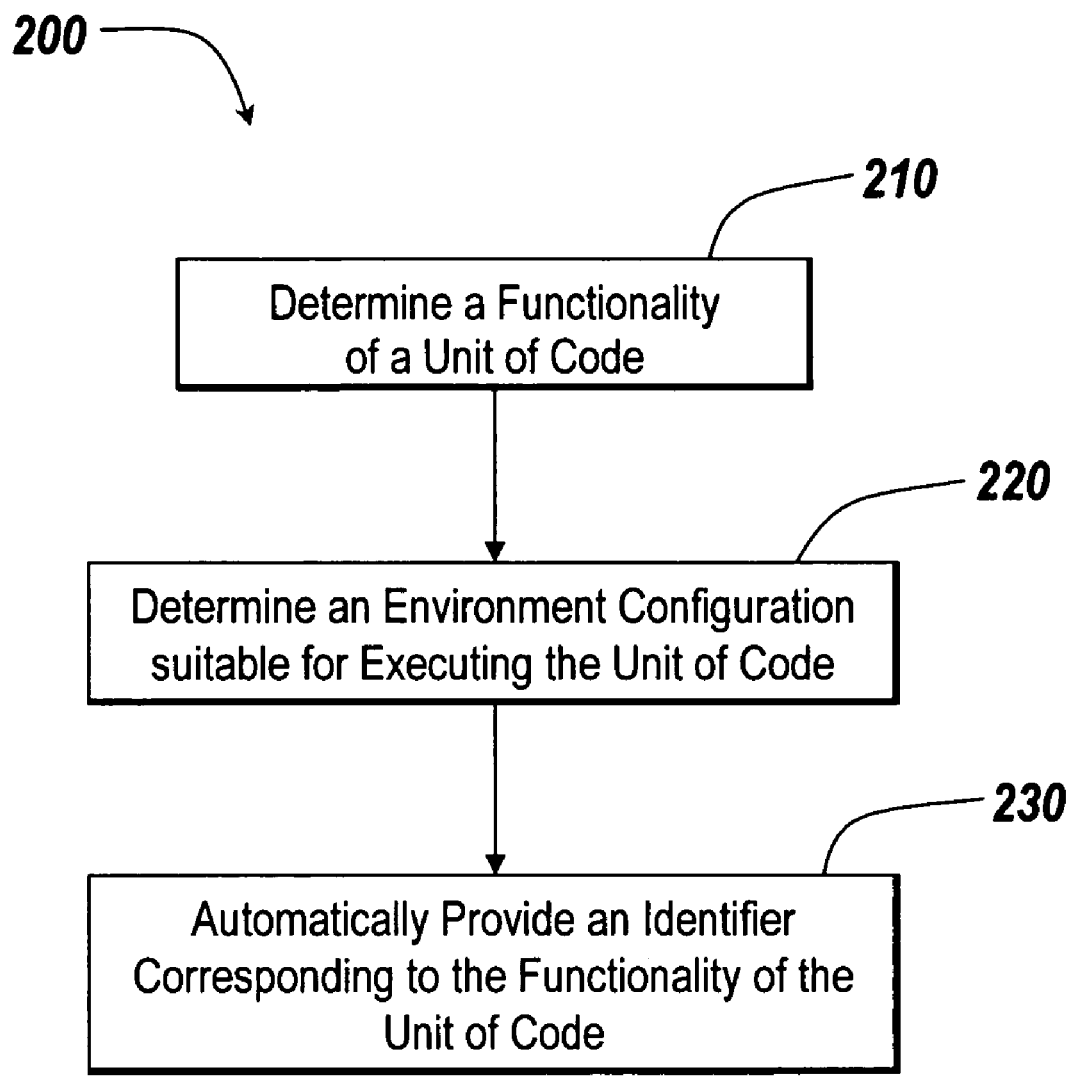
FIG. 3 illustrates a method according to another embodiment of the present invention.

According to another illustrative embodiment of the invention, a method 200 is illustrated by way of example in FIG. 3. A functionality of a unit of code is determined, step 210. An environment configuration suitable for executing the unit of code is also determined, step 200. An identifier is automatically provided to correspond to the functionality of the unit of code, step 230. Examples of identifiers can include file names, function names, macro names and class names.

Figure 4:
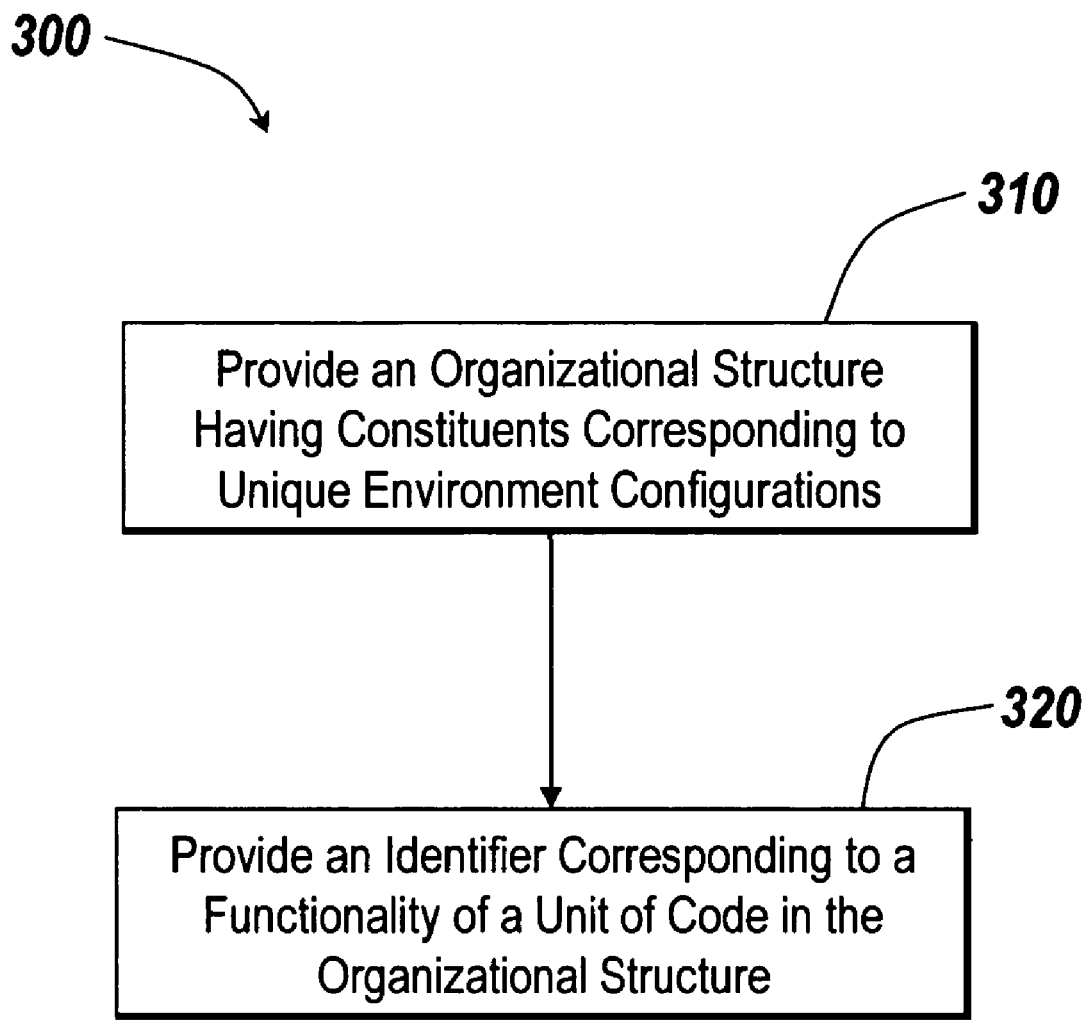
FIG. 4 illustrates another method according to an embodiment of the present invention.

According to another illustrative embodiment of the invention, a method 300 is illustrated by way of example in FIG. 4. An organizational structure is provided having a plurality of constituents that correspond to unique environment configurations, step 310. Examples of organizational structures can include directory structures and class structures, and examples of constituents can include directories and classes. An identifier is also provided to correspond to a functionality of a unit of code in the organizational structure, step 320. Examples of identifiers can include file names, function names, macro names and class names. The illustrative embodiment of the invention provides a directory structure having files in directories.

It is understood that the methods of the present invention may be located on a medium holding electronic device executable steps and/or may be methods used in an electronic device.

Figure 5:
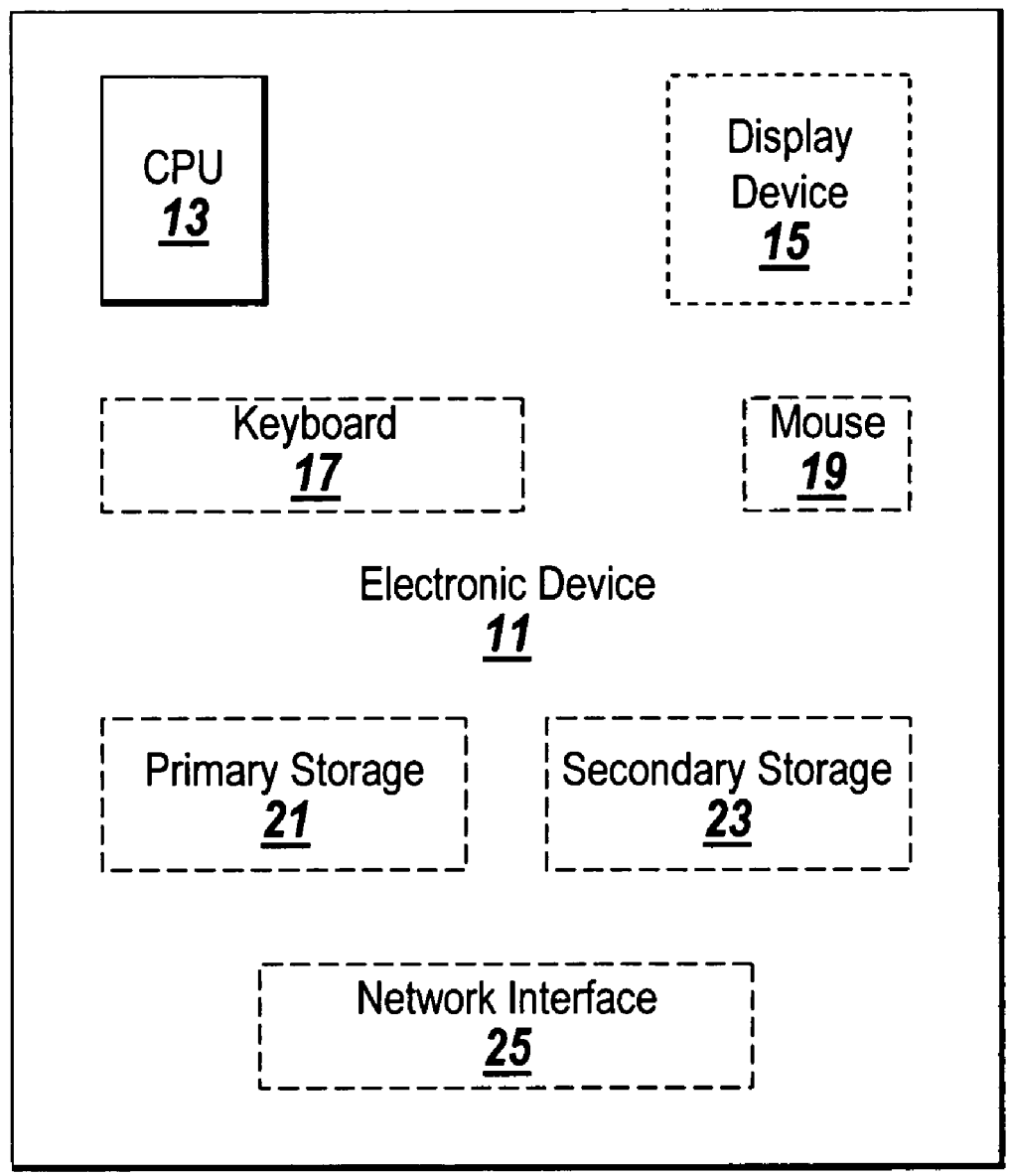
FIG. 5 is a diagrammatic illustration of an electronic device for implementing an aspect of the present invention.

FIG. 5 illustrates one example embodiment of an electronic device 11 suitable for practicing the illustrative embodiment of the present invention. The electronic device 11 is representative of a number of different technologies, such as mainframes, personal computers (PCs), laptop computers, workstations, personal digital assistants (PDAs), Internet appliances, cellular telephones, and the like. In the illustrated embodiment, the electronic device 11 includes a central processing unit (CPU) 13 and optionally has a display device 15. The display device 15 enables the electronic device 11 to communicate directly with a user through a visual display. The electronic device 11 may further include a keyboard 17 and a mouse 19. Other potential input devices not depicted include a stylus, trackball, joystick, touch pad, touch screen, and the like. The electronic device 11 may include primary storage 21 and/or secondary storage 23 for storing data and instructions. The storage devices 21 and 23 can include such technologies as a floppy drive, hard drive, tape drive, optical drive, read only memory (ROM), random access memory (RAM), and the like. Applications such as browsers, JAVA virtual machines, and other utilities and applications can be resident on one or both of the storage devices 21 and 23. The electronic device 11 may also include a network interface 25 for communicating with one or more electronic devices external to the electronic device 11. A modem (not shown) is one form of establishing a connection with an external electronic device or network. The CPU 13 has either internally, or externally, attached thereto one or more of the aforementioned components.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the invention, and exclusive use of all modifications that come within the scope of the appended claims is reserved. It is intended that the present invention be limited only to the extent required by the appended claims and the applicable rules of law.

What is claimed is:

1. In an electronic device, a method for management of software, comprising:
   providing an organizational structure in a storage having a plurality of members, each member corresponding to an environment configuration;
   determining a functionality for a unit code;
   determining an environment configuration suitable for executing said unit of code;
   generating a file name corresponding to said functionality for said unit of code;
   searching said organizational structure to find a constituent member corresponding to said environment configuration that has been determined to be suitable for executing said unit of code; and
   generating said unit of code if said file name is not found in said constituent member.

2. The method of claim 1, wherein said members of the organizational structure are directories, and said constituent member corresponding to said environment configuration suitable for executing said unit of code is a constituent directory.

3. The method of claim 2, the method further comprising naming said constituent directory to have a directory name corresponding to said environment configuration suitable for executing said unit of code.

4. The method of claim 2, wherein a plurality of characteristics of said environment configuration suitable for executing said unit of code include at least one of the group of a word size on a target processor, a word size on a host processor, an execution software type, an execution software version number and an operating system.

5. The method of claim 3, wherein said naming determines said constituent directory name by the use of a checksum of a plurality of characteristics of said environment configuration suitable for executing said unit of code.

6. The method of claim 3, wherein said characteristics of said environment configuration suitable for executing said unit of code include at least one of the group of a word size on a target processor, a word size on a host processor, an execution software type, an execution software version number and an operating system.

7. The method of claim 1, wherein said file name is determined by the use of a checksum of characteristics of said functionality.

8. The method of claim 1, wherein said checksum is based on at least one of the group of a MD5 checksum and a CRC checksum.

9. The method of claim 7, wherein said characteristics of said functionality include at least one of the group of an input type and an output type of said unit of code, an operation on an input to said unit of code.

10. The method of claim 1, wherein said generated file name corresponds to said environment configuration suitable for executing said unit of code.

11. The method of claim 1, wherein said generating a file name determines said file name by the use of a checksum of a plurality of characteristics of said functionality and said environment configuration suitable for executing said unit of code.

12. The method of claim 1, wherein said generating a file name determines said file name by the use of a consistent naming scheme representative of characteristics of said functionality.

13. The method of claim 1, wherein said file name is comprised of characters pertaining to an input type and an output type of said unit of code.

14. The method of claim 1, wherein said file name is comprised of characters pertaining to said functionality of said unit of code.

15. The method of claim 1, wherein said file name also corresponds to said environment configuration suitable for executing said unit of code.

16. The method of claim 1, wherein said unit of code is representative of a portion of a block diagram environment.

17. The method of claim 1, wherein said unit of code is representative of a portion of a modeling environment.

18. In an electronic device, a method for management of software, comprising:
   providing an organizational structure in a storage having a plurality of members, each member corresponding to an environment configuration;

determining a functionality for a unit of code;
determining an environment configuration suitable for executing said unit of code;
generating a function name corresponding to said functionality for said unit of code;
searching the organizational structure to find a constituent member corresponding to said environment configuration that has been determined to be suitable for executing said unit of code; and
generating said unit of code if said function name is not found in said constituent member.

19. The method of claim 18, the method further comprising naming said constituent member to have a member name corresponding to said environment configuration suitable for executing said unit of code.

20. The method of claim 19, wherein a plurality of characteristics of said environment configuration suitable for executing said unit of code include at least one of the group of a word size on a target processor, a word size on a host processor, an execution software type, an execution software version number and an operating system.

21. The method of claim 19, wherein said naming determines said member name by the use of a checksum of a plurality of characteristics of said environment configuration suitable for executing said unit of code.

22. The method of claim 21, wherein said characteristics of said environment configuration suitable for executing said unit of code include at least one of the group of a word size on a target processor, a word size on a host processor, an execution software type, an execution software version number and an operating system.

23. The method of claim 18, wherein said function name is determined by the use of a checksum of characteristics of said functionality.

24. The method of claim 18, wherein said checksum is based on at least one of the group of a MD5 checksum and a CRC checksum.

25. The method of claim 23, wherein said characteristics of said functionality include at least one of the group of an input type and an output type of said unit of code, an operation on an input to said unit of code.

26. The method of claim 18, wherein said generated function name also corresponds to said environment configuration suitable for executing said unit of code.

27. The method of claim 18, wherein said generating a function name determines said function name by the use of a checksum of a plurality of characteristics of said functionality and said environment configuration suitable for executing said unit of code.

28. The method of claim 18, wherein said generating a function name determines said function name by the use of a consistent naming scheme representative of characteristics of said functionality.

29. The method of claim 18, wherein said function name is comprised of characters pertaining to an input type and an output type of said unit of code.

30. The method of claim 18, wherein said function name is comprised of characters pertaining to said functionality of said unit of code.

31. The method of claim 18, wherein said function name also corresponds to said environment configuration suitable for executing said unit of code.

32. The method of claim 18, wherein said unit of code is representative of a portion of a block diagram environment.

33. The method of claim 18, wherein said unit of code is representative of a portion of a modeling environment.

34. In an electronic device, a method for management of software, comprising:
providing an organizational structure in a storage having a plurality of members, each member corresponding to an environment configuration;
determining a functionality for a unit of code;
determining a environment configuration suitable for executing said unit of code;
generating a macro name corresponding to said functionality for said unit of code;
searching the organizational structure to find a constituent member corresponding to said environment configuration suitable that has been determined to be for executing said unit of code; and
generating said unit of code if said macro name is not found in said constituent member.

35. The method of claim 34, the method further comprising naming said constituent member to have a member name corresponding to said environment configuration suitable for executing said unit of code.

36. The method of claim 35, wherein a plurality of characteristics of said environment configuration suitable for executing said unit of code include at least one of the group of a word size on a target processor, a word size on a host processor, an execution software type, an execution software version number and an operating system.

37. The method of claim 35, wherein said naming determines said member name by the use of a checksum of a plurality of characteristics of said environment configuration suitable for executing said unit of code.

38. The method of claim 37, wherein said characteristics of said environment configuration suitable for executing said unit of code include at least one of the group of a word size on a target processor, a word size on a host processor, an execution software type, an execution software version number and an operating system.

39. The method of claim 35, wherein said macro name is determined by the use of a checksum of characteristics of said functionality.

40. The method of claim 35, wherein said checksum is based on at least one of the group of a MD5 checksum and a CRC checksum.

41. The method of claim 39, wherein said characteristics of said functionality include at least one of the group of an input type and an output type of said unit of code, an operation on an input to said unit of code.

42. The method of claim 35, wherein said generated macro name also corresponds to said environment configuration.

43. The method of claim 35, wherein said generating a macro name determines said macro name by the use of a checksum of a plurality of characteristics of said functionality and said environment configuration suitable for executing said unit of code.

44. The method of claim 35, wherein said generating a macro name determines said macro name by the use of a constituent naming scheme representative of characteristics of said functionality.

45. The method of claim 35, wherein said macro name is comprised of characters pertaining to an input type and an output type of said unit of code.

46. The method of claim 35, wherein said macro name is comprised of characters pertaining to said functionality of said unit of code.

47. The method of claim 35, wherein said macro name also corresponds to said environment configuration suitable for executing said unit of code.

48. The method of claim 35, wherein said unit of code is representative of a portion of a block diagram environment.

49. The method of claim 35, wherein said unit of code is representative of a portion of a modeling environment.

50. In an electronic device, a method for management of software, comprising:
provided an organizational structure in a storage having a plurality of members, each member corresponding to an environment configuration;
determining a functionality for a unit of code;
determining an environment configuration suitable for executing said unit of code;
generating a class name corresponding to said functionality for said unit of code;
searching the organizational structure to find a constituent member corresponding to said environment configuration that has been determined to be suitable for executing said unit of code; and
generating said unit of code if said class name is not found in said constituent member.

51. The method of claim 50, the method further comprising naming said constituent member to have a member name corresponding to said environment configuration suitable for executing said unit of code.

52. The method of claim 51, wherein a plurality of characteristics of said environment configuration suitable for executing said unit of code include at least one of the group of a word size on a target processor, a word size on a host processor, an execution software type, an execution software version number and an operating system.

53. The method of claim 51, wherein said naming determines said member name by the use of a checksum of a plurality of characteristics of said environment configuration suitable for executing said unit of code.

54. The method of claim 53, wherein said characteristics of said environment configuration suitable for executing said unit of code include at least one of the group of a word size on a target processor, a word size on a host processor, an execution software type, an execution software version number and an operating system.

55. The method of claim 50, wherein said class name is determined by the use of a checksum of characteristics of said functionality.

56. The method of claim 50, wherein said checksum is based on at least one of the group of a MD5 checksum and a CRC checksum.

57. The method of claim 55, wherein said characteristics of said functionality include at least one of the group of an input type and an output type of said unit of code, an operation on an input to said unit of code.

58. The method of claim 50, wherein said generated class name also corresponds to said environment configuration.

59. The method of claim 50, wherein said generating a class name determines said class name by the use of a checksum of a plurality of characteristics of said functionality and said environment configuration.

60. The method of claim 50, wherein said generating a class name determines said class name by the use of a constituent naming scheme representative of characteristics of said functionality.

61. The method of claim 50, wherein said class name is comprised of characters pertaining to an input type and an output type of said unit of code.

62. The method of claim 50, wherein said class name is comprised of characters pertaining to functionality of said unit of code.

63. The method of claim 50, wherein said class name also corresponds to said environment configuration suitable for executing said unit of code.

64. The method of claim 50, wherein said unit of code is representative of a portion of a block diagram environment.

65. The method of claim 50, wherein said unit of code is representative of a portion of a modeling environment.

66. In an electronic device, a method for management of software, comprising:
providing an organizational structure in a storage having a plurality of members, each member corresponding to an environment configuration;
determining a functionality for a unit of code;
determining an environment configuration suitable for executing said unit of code;
providing an identifier corresponding to a functionality of a unit of code;
searching the organizational structure to find a constituent member corresponding to said environment configuration suitable that has been determined to be suitable for executing said unit of code; and
generating said unit of code if said identifier is not found in said constituent member.

67. The method of claim 66, the method further comprising naming said constituent member to have a member name corresponding to said environment configuration suitable for executing said unit of code.

68. The method of claim 67, wherein said naming determines said member name by the use of a checksum of a plurality of characteristics of said environment configuration suitable for executing said unit of code.

69. The method of claim 66, wherein said organizational structure is a directory structure and said identifier is a file name.

70. In an electronic device, a method for management of software, comprising:
selecting a utility to process having a first functionality;
determining a characteristic of a first environment configuration suitable for operation of said utility;
searching an organizational structure to find a constituent member corresponding to said first environment configuration;
creating said constituent member corresponding to said first environment configuration, if said constituent member corresponding to said first environment configuration is not found in said searching an organizational structure step;
generating a name for said first functionality;
searching said constituent member corresponding to said first environment configuration to find an identifier of a unit of code, said identifier corresponding to said name for said first functionality; and
creating said unit of code having said first functionality and being suitable for execution in said first environment configuration, if said identifier is not found in said searching.

71. The method of claim 70, wherein said searching an organizational structure step uses a checksum of a plurality of characteristics of said first environment configuration.

72. The method of claim 70, wherein said searching a constituent member corresponding to said first environment configuration uses a checksum of a plurality of characteristics of said first functionality.

73. The method of claim 72 further comprising:
generating a comment string corresponding to said first functionality of said unit of code; and verifying said functionality of said unit of code by the use of said checksum and said comment string.

74. The method of claim 70, wherein said utility is operational in a block diagram environment.

75. The method of claim 70, wherein said utility is operational in a modeling environment.

76. The method of claim 70, wherein said identifier is a file name.

77. The method of claim 70, wherein said identifier is a function name.

78. The method of claim 70, wherein said identifier is a macro name.

79. The method of claim 70, wherein said identifier is a class name.

80. The method of claim 70, wherein said organizational structure is a directory structure.

81. The method of claim 70, wherein said organizational structure is a class structure.

82. The method of claim 70, wherein said constituent member is a file.

83. A computer readable medium having instructions stored therein which, when executed by a processor, cause the processor to:
   a select utility to process having a first functionality;
   determine a characteristic of a first environment configuration suitable for operation of said utility;
   search an organizational structure stored in a storage for a constituent member corresponding to said first environment configuration;
   create said constituent member corresponding to said first environment configuration, if said constituent member corresponding to said first environment configuration is not found in said searching an organizational structure step;
   generate a name for said first functionality;
   search said constituent member corresponding to said first environment configuration for an identifier of a unit of code, said identifier corresponding to said name for said first functionality; and
   create said unit of code having said first functionality and suitable for execution in said first environment configuration, if said file name is not found in said searching said constituent member corresponding to said first environment configuration step.

84. The medium of claim 83, wherein said searching an organizational structure uses a checksum of a plurality of characteristics of said first environment configuration.

85. The medium of claim 83, wherein said searching a constituent member corresponding to said first environment configuration uses a checksum of a plurality of characteristics of said first functionality.

86. The medium of claim 85, the instructions further causing said processor to:
   generate a comment string corresponding to said first functionality of said unit of code; and
   verify said functionality of said unit of code by the use of said checksum and said comment string.

87. The medium of claim 83, wherein said utility is operational in a block diagram environment.

88. The medium of claim 83, wherein said utility is operational in a modeling environment.

89. The medium of claim 83, wherein said identifier is a file name.

90. The medium of claim 83, wherein said identifier is a function name.

91. The medium of claim 83, wherein said identifier is a macro name.

92. The medium of claim 83, wherein said identifier is a class name.

93. The medium of claim 83, wherein said organizational structure is a directory structure.

94. The medium of claim 83, wherein said organizational structure is a class structure.

95. The medium of claim 83, wherein said constituent member is a file.

96. In an electronic device, a system for managing code, comprising:
   a storage for storing:
      a functionality identifier, identifying a functionality of a unit of code;
      an environment configuration identifier, identifying an environment configuration suitable for executing said unit of code;
   a processor to:
      execute a naming mechanism that derives a name for said unit of code corresponding to said functionality for said unit of code; and
      locate a file having said name in a directory corresponding to said environment configuration.

97. The system of claim 96, wherein said system names said directory with a name corresponding to said environment configuration.

98. The system of claim 96, wherein said name comprises at least one of a file name, a function name, a macro name, a class name, and an identifier.

99. The system of claim 96, wherein a plurality of characteristics of said environment configuration include at least one of the group of a word size on a target processor, a word size on a host processor, an execution software type, an execution software version number and an operating system.

100. The system of claim 96, wherein said unit of code is representative of at least a portion of a block diagram environment.

101. The system of claim 96, wherein said unit of code is representative of at least a portion of a modeling environment.

* * * * *

UNITED STATES PATENT AND TRADEMARK OFFICE
CERTIFICATE OF CORRECTION

PATENT NO. : 7,500,220 B1  Page 1 of 1
APPLICATION NO. : 10/749294
DATED : March 3, 2009
INVENTOR(S) : Yang Feng et al.

It is certified that error appears in the above-identified patent and that said Letters Patent is hereby corrected as shown below:

At column 1, line 33, "includes," should be --include--.

At column 2, line 49, "device," should be --device;--.

At column 2, line 49, "The," should be --the--.

At column 3, line 53, "a" should be --an--.

At column 3, line 57, "20," should be --20--.

At column 3, line 57, "a" should be --an--.

At column 3, line 62, "generation," should be --generation--.

At column 5, line 55, "identifies" should be --identifiers--.

At column 5, line 55, "code" should be --codes--.

Signed and Sealed this

Fifth Day of May, 2009

JOHN DOLL
*Acting Director of the United States Patent and Trademark Office*